(12) United States Patent
Roda et al.

(10) Patent No.: US 12,424,349 B2
(45) Date of Patent: Sep. 23, 2025

(54) FLAME-RETARDANT CABLE WITH SELF-EXTINGUISHING LAYER

(71) Applicants: Prysmian S.p.A., Milan (IT); Politecnico di Milano, Milan (IT)

(72) Inventors: Elena Roda, Segrate (IT); Cristian Gambarotti, Cremona (IT); Ada Truscello, Merate (IT); Franco Galletti, Casatenovo (IT)

(73) Assignees: Prysmian S.p.A., Milan (IT); Politecnico di Milano, Milan (IT)

( * ) Notice: Subject to any disclaimer, the term of this patent is extended or adjusted under 35 U.S.C. 154(b) by 172 days.

(21) Appl. No.: 18/085,750

(22) Filed: Dec. 21, 2022

(65) Prior Publication Data

US 2023/0207154 A1 Jun. 29, 2023

(30) Foreign Application Priority Data

Dec. 28, 2021 (IT) .................. 102021000032810

(51) Int. Cl.
*H01B 7/02* (2006.01)
*C08K 3/22* (2006.01)
*C08K 5/1545* (2006.01)
*H01B 3/10* (2006.01)
*H01B 3/30* (2006.01)
(Continued)

(52) U.S. Cl.
CPC ............... *H01B 7/295* (2013.01); *C08K 3/22* (2013.01); *C08K 5/1545* (2013.01); *H01B 3/10* (2013.01); *H01B 3/307* (2013.01); *H01B 3/46* (2013.01); *C08K 2003/2224* (2013.01); *C08K 2003/2227* (2013.01)

(58) Field of Classification Search
CPC . H01B 3/10; H01B 3/307; H01B 3/46; H01B 7/02; H01B 7/04; H01B 7/06; H01B 7/295; C08K 3/016; C08K 3/22; C08K 5/1545; C08K 2003/2224; C08K 2003/2227; C08K 23/06; C08K 21/02; C08K 21/06; C08K 2201/02; C08K 2203/202; C08K 2207/06
USPC ....... 174/110 R–120 SR; 524/444, 447, 517, 524/522
See application file for complete search history.

(56) References Cited

U.S. PATENT DOCUMENTS 4,515,633 A * 5/1985 Cruz, Jr. ................. A23K 50/42
106/204.3
6,492,453 B1 * 12/2002 Ebrahimian ............. C08K 3/22
524/517
(Continued)

OTHER PUBLICATIONS

Christopher E. Hobbs, "Recent Advances in Bio-Based Flame Retardant Additives for Synthetic Polymeric Materials", Polymers, 11, 224, 2019, pp. 1-31.
(Continued)

*Primary Examiner* — William H. Mayo, III
(74) *Attorney, Agent, or Firm* — Element IP, PLC (57) ABSTRACT

A flame-retardant cable includes at least one core having a conductor and at least one protecting layer surrounding the core. The protecting layer is made from a low smoke zero halogen (LS0H) flame-retardant polymer composition having at least 70 phr of a polyethylene homopolymer or copolymer having a density lower than 0.90 g/cm³ as a halogen-free polymeric base, 100 to 800 phr of at least one metal hydroxide, and at least 10 phr of a tannin.

15 Claims, 3 Drawing Sheets

(51) Int. Cl.
*H01B 3/46* (2006.01)
*H01B 7/295* (2006.01)

(56) References Cited

U.S. PATENT DOCUMENTS

| | | | |
|---|---|---|---|
| 2004/0024101 A1* | 2/2004 | Hayes | C08L 69/00 |
| | | | 524/445 |
| 2004/0024102 A1* | 2/2004 | Hayes | B32B 7/12 |
| | | | 524/425 |
| 2006/0142460 A1* | 6/2006 | Cogen | C08K 5/0066 |
| | | | 524/445 |
| 2019/0077940 A1* | 3/2019 | Deans | C08L 55/02 |
| 2020/0343021 A1* | 10/2020 | Galletti | C08K 3/016 |
| 2021/0233683 A1 | 7/2021 | Grunwald | |

OTHER PUBLICATIONS

Search Report issued Aug. 5, 2022 in Italian Patent Application No. IT202100032810 (with English translation of Categories), 3 pages.

* cited by examiner

FLAME-RETARDANT CABLE WITH SELF-EXTINGUISHING LAYER

FIELD OF APPLICATION

The present disclosure relates to a flame-retardant cable, such as an electric, optical or hybrid (both electric and optical) cable.

In particular, the present disclosure relates to a flame-retardant cable having a low-smoke zero-halogen (LS0H) self-extinguishing layer which exhibits substantially no dripping (occurrence of flaming droplets) when exposed to high temperatures, e.g. in case of fire.

PRIOR ART

As known, an important requirement for electric, optical or hybrid cables, especially for building or transport application, is a suitable behaviour in case of fire to avoid flame propagation and smoke generation in populated environment.

In this connection, international qualification standards require that, in case of fire, electric cables have limited flame and toxic smoke production and spread, and low or no flaming droplet production. Such standards are more and more stringent about the performances required to a flame-retardant cable to the end of improving the safety in buildings and transports in case of fire.

The performances against fire can be assured by one or more cable coatings, such as the electric insulation or a cable sheath, endowed with certain properties when flamed.

In this connection, it is known to produce a cable coating with flame-retardant properties and no emission of toxic smoke from a low smoke zero halogen (LS0H) polymer composition comprising a polymer base material charged with inorganic hydroxide fillers, such as magnesium hydroxide and/or aluminium hydroxide, which confer flame-retardant properties to a cable coating layer.

However, this solution has the drawback of requiring large amounts of filler to achieve a satisfactory level of effectiveness in terms of retarding flame propagation or self-extinguishing properties. The use of such amounts can lead to a considerable increase in the viscosity of the material and consequently to a significant decrease in extrusion speeds and a drop in productivity. Adding high amounts of flame-retardant fillers may also lead to a substantial deterioration in the mechanical properties of the resulting cable.

Moreover, the use of flame-retardant fillers, such as magnesium hydroxide and/or aluminium hydroxide, to the polymer base material of the cable does not fully prevent the formation of flaming droplets when the cable is exposed to high temperatures, e.g. in case of fire. The Applicant experienced that, under fire, the filled material collapsed in significant pieces which kept on burning after falling.

US20210233683 discloses an electrical cable comprising at least one conductor having a primary insulation and an outer jacket covering at least a portion of the at least one conductor, the outer jacket comprising at least one flame-retardant comprising, alone or in combination with a zinc compound, cellulose, gallic acid (3,4,5-trihydroxybenzoic acid), condensed tannin monomer, chemically modified condensed tannin monomer, tannic acid, aluminium hydroxide, alumina trihydrate, magnesium hydroxide. The outer jacket can be constructed of polyvinyl chloride (PVC).

C. E. Hobbs, "Recent Advances in Bio-based flame retardant additives for synthetic polymeric materials" Polymers 2019, 11, 224 discloses that the use of tannic acid and tannins as additives for synthetic polymers is relatively limited. This is possibly due to colour or incompatibility with hydrophobic polymers. Tannins could be used to instill synthetic polymers with higher levels of flame retardancy. When mixed with a synthetic polymer (acrylonitrile-butadiene-styrene) tannin increased the limiting oxygen index (LOI), but no values were provided.

Cables having a layer based on polymer compositions including a mixture of flame-retardant filler(s) and flame-retardant aid(s) are to be carefully considered. The combination of different fillers/additives or of different amounts thereof can, in fact, provide unpredictable and unwanted results. In addition, some of the fillers should be used in controlled amount because they can impair mechanical properties of the coating layer material and/or substantially increase cable cost and/or produce toxic fumes.

SUMMARY OF THE DISCLOSURE

In view of the above, a main object of the present disclosure is providing a flame-retardant cable having a self-extinguishing layer which exhibits substantially no dripping (occurrence of flaming droplets) when exposed to high temperatures, e.g. in case of fire, so as to meet the stricter requirements for certification according to the current international standards.

Another object of the present disclosure is providing a flame-retardant cable as above which, in addition to exhibit substantially no dripping under fire, maintains good mechanical properties and is easily workable, particularly in extrusion processes.

The Applicant found that a cable, either electric or optical or hybrid, has flame-retardant and self-extinguishing properties without producing droplets under fire when it is provided with a core surrounded by a protecting layer made of a polymer composition comprising a LS0H polymeric base material, at least one metal hydroxide as flame-retardant filler and a tannin as flame-retardant aid in specific amount ranges.

Accordingly, the present disclosure relates to a flame-retardant cable having at least one core comprising a conductor and at least one protecting layer surrounding the core, wherein the protecting layer is made from a low smoke zero halogen (LS0H) flame-retardant polymer composition comprising at least 70 phr of a polyethylene homopolymer or copolymer having a density lower than 0.90 g/cm$^3$ as halogen-free polymeric base added with a) from 100 to 800 phr of at least one metal hydroxide; and b) at least 10 phr of a tannin.

The cable according to the present disclosure is suitable for carrying current or data or both. Thus, the cable according to the present disclosure can be an electric cable, an optical cable or a hybrid cable.

When the cable of the present disclosure is an electric cable, it can be suitable for telecommunication or for carrying current at low voltage (LV; up to 1 kV) or medium voltage (MV; from 1 to 30-35 kV).

The electric cable of the disclosure can be a single electric core cable or a multi-core cable, such as a three-phase cable having three electric cores. Each electric core comprises an electric conductor made, for example, of an electrically conductive metal (e.g. copper or aluminium or both), surrounded by an electrically insulating layer or by an electrically insulating system comprising an inner semi-conductive layer arranged in a radially outer position with respect to the conductor, an insulating layer arranged in a radially outer position with respect to the inner semi-conductive layer, and, optionally, an outer semi-conductive layer arranged in a radially outer position with respect to the insulating layer. The insulating layer or system can be made of polymeric material such as polyethylene homopolymers or copolymers, polypropylene polymers and blends thereof.

When the cable of the present disclosure is an optical cable, it can comprise one or more optical cores. Each optical core may comprise an optical waveguide surrounded by one or more polymeric coatings and, optionally, a polymeric buffer.

When the cable of the present disclosure is an optical cable, it can comprise one or more electric and optical core as outlined above.

Polyethylene homopolymer or copolymer, as the term is used therein, means any homopolymer or copolymer of ethylene with one or more alpha-olefins having from 3 to 12 carbon atoms, for example from 4 to 8 carbon atoms. Examples of polyethylene homopolymer are low density polyethylene (LDPE), medium density polyethylene (MDPE) or high density polyethylene (HDPE). Examples of polyethylene copolymer are ethylene-propylene rubber (EPR), ethylene-propylene-diene rubber (EPDM) or linear low density polyethylene (LLDPE) manufactured by Ziegler-Natta or metallocene catalysts. Examples of alpha-olefins are propylene, 1-butene, 1-hexene, 4-methyl-1-pentene, and 1-octene. The polyethylene homopolymer or copolymer can be thermoplastic or crosslinked, for example, by a peroxide or silane cross-linking agent.

It should be noted that the designations of low-, medium- and high-density and the like are given by the specific polymer manufacturer and no chemical nomenclature assigns to such designations a specific range of density values. Accordingly, in the present description and claims, the term "low-density", "medium-density" and "high-density" and the like are purely indicative, while the suitable polyethylene polymers are defined by their density value or range of values.

The halogen-free polymeric base of the present LS0H composition is a polyethylene homopolymer or copolymer having a density lower than 0.90 g/cm$^3$ as measured according to ASTM D792-08 or ASTM D1505-03. Such homopolymer or copolymer is the major component of the halogen-free polymeric base of the LS0H composition of the present disclosure and can be present in an amount up to 100 phr. In an embodiment, the polyethylene having a density lower than 0.90 g/cm$^3$ is at least one of LLDPE and EPR.

In an embodiment, the amount of metal hydroxide in the LS0H composition of the present disclosure is from 150 phr to 400 phr.

In an embodiment, the metal hydroxide is selected from magnesium hydroxide, aluminium hydroxide or a combination thereof. Both magnesium hydroxide and aluminium hydroxide can be of natural or synthetic origin. For example, the metal hydroxide suitable for the present cable is magnesium hydroxide of natural origin (brucite), optionally surface treated.

In an embodiment, the amount of tannin in the LS0H composition of the present disclosure is from 10 phr to 60 phr.

As reported, for example, by C. E. Hobbs cited above, tannins are some of the most abundant natural polyphenols available from plants and they can be both condensed and hydrolysable. A tannin according to the present disclosure can be of natural origin, e.g. coming from a plant extract, or can be produced in a synthetic way. In an embodiment, the tannin is tannic acid.

In an embodiment, the LS0H polymer composition can comprise a polysiloxane, such as polydimethylsiloxane.

The polysiloxane may be any compound comprising a main chain of repeating —Si—O— unit and side chains chosen from a linear or branched alkyl group having from 1 to 6 carbon atoms, a linear or branched alkoxy group having from 1 to 6 carbon atoms, a linear or branched alkenyl group, e.g. vinyl group, having from 1 to 6 carbon atoms, a phenyl group, a phenoxy group and their combinations.

In an embodiment, the amount of polysiloxane in the LS0H polymer composition of the present disclosure is from 1.5 to 4 phr.

In an embodiment, the LS0H polymer composition can comprise a polyethylene homopolymer or copolymer having a density from 0.90 to 0.92 g/cm$^3$. In an embodiment the polyethylene having a density of 0.90-0.92 g/cm$^3$ can be LLDPE, VLDPE (very low density polyethylene) or LDPE.

In an embodiment, the amount of the polyethylene homopolymer or copolymer having a density of 0.90-0.92 g/cm$^3$ is up to 25 phr, for example from 15 phr to 25 phr.

In an embodiment, the LS0H polymer composition can comprise a polyethylene homopolymer or copolymer having a density greater than 0.92 g/cm$^3$. In an embodiment the polyethylene having a density greater than 0.92 g/cm$^3$ can be an HDPE.

In an embodiment, the amount of the polyethylene homopolymer or copolymer having a density greater than 0.92 g/cm$^3$ is up to 15 phr, for example from 5 phr to 15 phr.

In an embodiment the flame-retardant polymer composition comprises a polyethylene homopolymer or copolymer grafted with a compatibilizer. Such polyethylene homopolymer or copolymer can be any polyethylene homopolymer or copolymer for the present LS0H polymer composition. Such polyethylene homopolymer or copolymer is at least partially grafted with the compatibilizer. The compatibilizer can be an anhydride, like maleic anhydride. The compatibilizer can be present in an amount from 5 phr to 15 phr. The presence of the grafted anhydride units allows to improve coupling interactions with the hydroxyl groups of the flame-retardant filler (metal hydroxide) surface during the mixing process, thus enhancing its phase dispersion within the polymer matrix and, in turn, the mechanical properties of the polymer material formed with the flame retardant composition of the present disclosure.

In an embodiment, the protecting layer made from the LS0H polymeric composition of the present disclosure is the outermost layer of the cable, such as a cable outer sheath or a cable jacket.

In an embodiment, the protecting layer as outermost cable layer is made from an LS0H flame-retardant polymer composition of the present disclosure also comprising at least one of:
 a polyethylene homopolymer or copolymer having a density of 0.90-0.92 g/cm$^3$ in an amount up to 25 phr;
 a polyethylene homopolymer or copolymer having a density greater than 0.92 g/cm$^3$; and
 a polysiloxane, such as polydimethylsiloxane.

In an embodiment, the outermost layer is made from the LS0H polymeric composition of the present disclosure comprising an amount of metal hydroxide from 100 phr to 250 phr, for example from 150 phr to 220 phr.

In an embodiment, the outermost layer made from the LS0H polymeric composition of the present disclosure is a skin layer covering a cable jacket or sheath. In an embodiment, the skin layer has a thickness of from 0.05 to 0.5 mm.

In an embodiment, the flame-retardant cable has at least two cores and the at least one protecting layer made from the LS0H polymeric composition of the present disclosure is a filler layer.

In an embodiment, the filler layer made from the LS0H polymeric composition of the present disclosure comprises an amount of metal hydroxide from 300 phr to 800 phr, for example from 300 phr to 400 phr.

In an embodiment, the cable comprises at least two cores, each comprising a conductor surrounded by an electrically insulating layer or an electrically insulating system as above, an outer layer such as a jacket or a sheath surrounding the cable cores, and a filler layer filling the gaps between the cores and other layer/s surrounding such cores, wherein the filler layer is made from the LS0H polymeric composition of the present disclosure. In this case, the outer layer can be flame-retardant or not, for example it can be made of a polymer material including a base polymer such as polyethylene or a polyethylene mixture, optionally filled with flame-retardant fillers, such as magnesium or aluminium hydroxide, but not the other components of the polymeric composition according to the present disclosure.

The Applicant found that a cable provided with a protecting layer made from a composition as specified above has improved reaction to fire in terms of flame-extinguishing properties with a substantial absence of dripping during burning which allows the cable to meet the stricter requirements for certification of current international standards.

In addition, the Applicant found that the provision of the protecting layer as specified above can allow protecting the cable under fire by imparting suitable flame-retardant properties without impairing its mechanical properties as well as allowing a suitable workability of the polymer material forming the protecting layer, for example in the extrusion step of the cable manufacturing.

DETAILED DESCRIPTION

For the purpose of the present description and of the appended claims, the words "a" or "an" should be read to include one or at least one and the singular also includes the plural unless it is obvious that it is meant otherwise. This is done merely for convenience and to give a general sense of the disclosure.

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

Moreover, in the present description, it is to be understood that the technical features described specifically above and below can be combined with each other in any way, constituting further embodiments of the present disclosure which may not be specifically described for conciseness, but which fall within the scope of the present disclosure.

In the present description and claims, unless specified otherwise, the amount of the components of the flame-retardant polymer composition is given in phr where the term "phr" is used to indicate parts by weight per 100 parts by weight of the base polymeric material.

In the present description the amount of the components of the flame-retardant polymer composition can also be given in percent by weight (wt %) where the term "wt %" is used to indicate percent by weight with respect to the total amount of the composition.

The features and advantages of the present disclosure will be made apparent by the following detailed description of some exemplary embodiments thereof, provided merely by way of non-limiting examples, description that will be conducted also by referring to the attached drawings, wherein.

Figure 1:
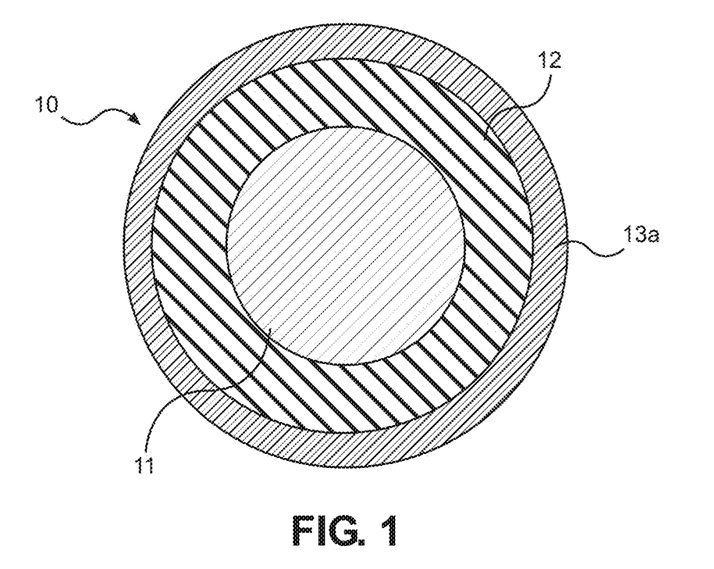
FIG. 1 is a cross-sectional view of an electric cable according to the present disclosure.

FIG. 1 shows a low voltage (LV) electric cable 10 according to a non-limiting embodiment of the disclosure. Cable 10 has a single core comprising an electric conductor 11 made of an electrically conductive material, e.g. at least one of aluminium, copper or carbon nanotubes. The conductor 11 may be in the form of a solid bar or a of bundle of wires, optionally stranded.

The conductor 11 is electrically insulated by an electrically insulating layer 12 in form of an extruded polymeric coating optionally having flame-retardant properties. For example, the insulating layer 12 can be made of an extruded polymeric material such as polyethylene or a polyethylene mixture, optionally filled with flame-retardant fillers, such as magnesium or aluminium hydroxide, but not the other components of the polymeric composition according to the present disclosure.

In the embodiment shown in FIG. 1, the insulating layer 12 is extruded in direct contact with the conductor 11.

Cable 10 comprises a jacket 13a as outermost layer, made of a polymeric material optionally having flame-retardant properties. The jacket 13a surrounds the insulating layer 12 and, optionally, is in direct contact thereto. The jacket 13a is manufactured by extrusion. The jacket 13a has a thickness suitable for providing the cable with mechanical protection.

In cable 10, the jacket 13a can be made of an LS0H polymeric composition according to the present disclosure.

Figure 2:
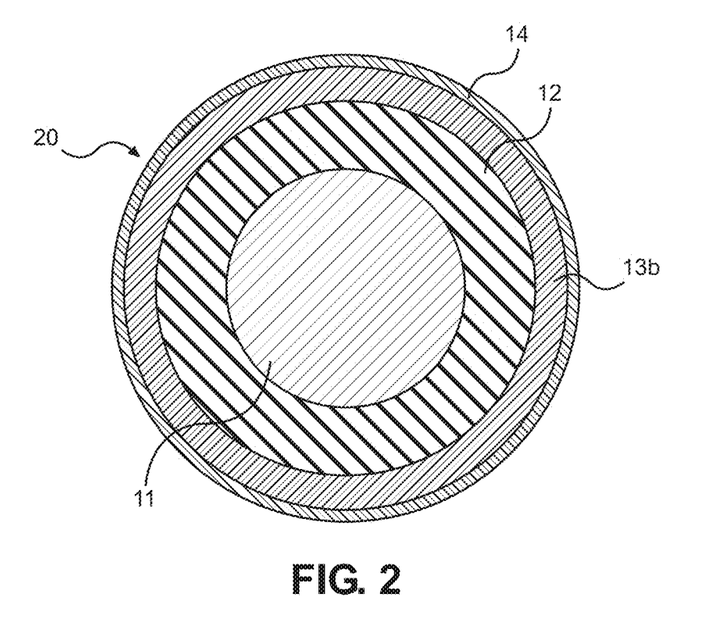
FIG. 2 is a cross-sectional view of another electric cable according to the present disclosure.
Figure 3:
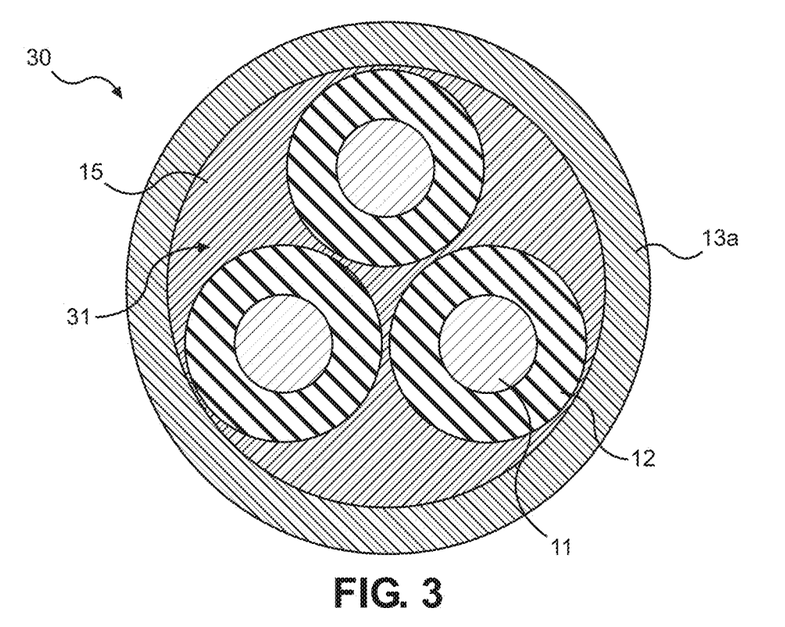
FIG. 3 is a cross-sectional view of a three-phase electric cable according to the present disclosure.
Figure 4:
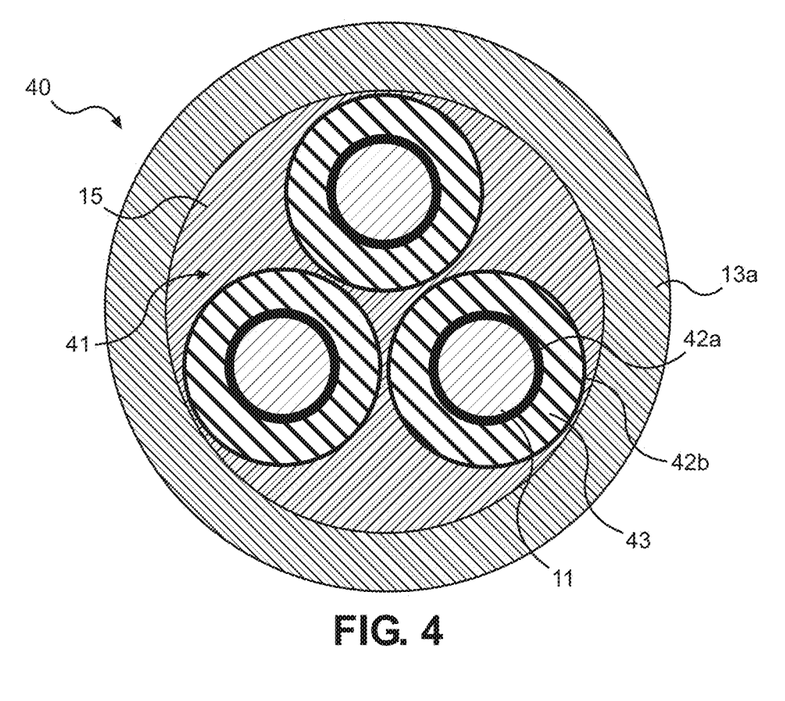
FIG. 4 is a cross-sectional view of another three-phase electric cable according to the present disclosure.

FIGS. 2-4 show electric cables according to other non-limiting embodiments of the disclosure. In such cables, those features that are structurally and/or functionally equivalent to corresponding features of the cable 10 described in FIG. 1 will be assigned the same reference numbers of the latter and will not be further described for conciseness.

In details, FIG. 2 shows a low voltage (LV) electric cable 20 according to another non-limiting embodiment of the disclosure. The cable 20 differs from the cable 10 described above in that the outermost layer is a skin layer 14, made of the LS0H polymeric composition according to the present disclosure. The skin layer 14 surrounds and directly contacts a jacket 13b.

The skin layer 14 is manufactured by extrusion. The skin layer 14 has a thickness substantially smaller than that of the jacket 13b, such thickness being of from 0.05 to 0.5 mm, for example of from 0.1 to 0.2 mm, and does not provide significant mechanical protection to the cable 20.

In this embodiment, the jacket 13b can be made of an extruded flame-retardant polymer material, e.g. a polymer material including a base polymer such as polyethylene or a polyethylene mixture, filled with flame-retardant fillers, such as magnesium or aluminium hydroxide, but not the other components of the polymeric composition according to the present disclosure.

FIG. 3 shows a low voltage (LV) electric cable 30 according to another non-limiting embodiment of the disclosure. Cable 30 is a three-phase cable comprising three electric cores 31. Each core 31 comprises a conductor 11 surrounded by an electrically insulating layer 12, like that described for cable 10 of FIG. 1.

The three cores 31 are stranded one another and surrounded by a jacket 13a as outermost layer. A filler (or bedding) layer 15 made of polymeric material can be provided filling the gaps between the stranded cores 31 and the jacket 13a.

In this embodiment, at least one of the outermost layer of the cable (jacket 13a) and the filler layer 15 is a protecting layer made of the LS0H polymeric composition according to the present disclosure. When only the filler layer 15 is made of the LS0H polymeric composition of the present disclosure, the jacket 13b can be made of an extruded flame retardant polymer material, e.g. a polymer material including a base polymer such as polyethylene or a polyethylene mixture, filled with flame-retardant fillers, such as magnesium or aluminium hydroxide, but not the other components of the polymeric composition according to the present disclosure. Alternatively, the outermost layer of the cable (jacket 13a) is made of the LS0H polymeric composition of the present disclosure, and the filler layer 15 can be made of an extruded flame retardant polymer material, e.g. LS0H polymer material including a base polymer such as polyethylene or a polyethylene mixture, filled with flame-retardant fillers, such as magnesium or aluminium hydroxide, but not the other components of the polymeric composition according to the present disclosure. Both the outermost layer of the cable (jacket 13a) and the filler layer 15 can be made of the LS0H polymeric composition of the present disclosure.

FIG. 4 shows a medium voltage (MV) electric cable 40 according to another non-limiting embodiment of the disclosure. Cable 40 is a three-phase cable comprising three electric cores 41. Each core 41 comprises a conductor 11, an inner semi-conductive layer 42a arranged in a radially outer position with respect to the conductor 11 and in direct contact thereto, an insulating layer 43 arranged in a radially outer position with respect to the inner semi-conductive layer 42a and in direct contact thereto, and an outer semi-conductive layer 42b arranged in a radially outer position with respect to the insulating layer 43 and in direct contact thereto.

The cable 40 further includes a jacket 13a arranged in a radially outer position with respect to the outer semi-conductive layer 42b and surrounding the cable cores 41. A filler layer 15 can also be arranged between the jacket 13a and the cable cores 41 to fill the gaps between them.

According to the disclosure, at least one of the jacket 13a and the filler layer 15 can be made of the LS0H polymeric composition according to the present disclosure. When only the filler layer 15 is made of the LS0H polymeric composition of the present disclosure, the jacket 13a can be made of an extruded flame-retardant polymer material, e.g. a polymer material including a base polymer such as polyethylene or a polyethylene mixture, filled with flame-retardant fillers, such as magnesium or aluminium hydroxide, but not the other components of the polymeric composition according to the present disclosure. Alternatives as disclosed above in connection with the cable of FIG. 3 are applicable.

Figure 5:
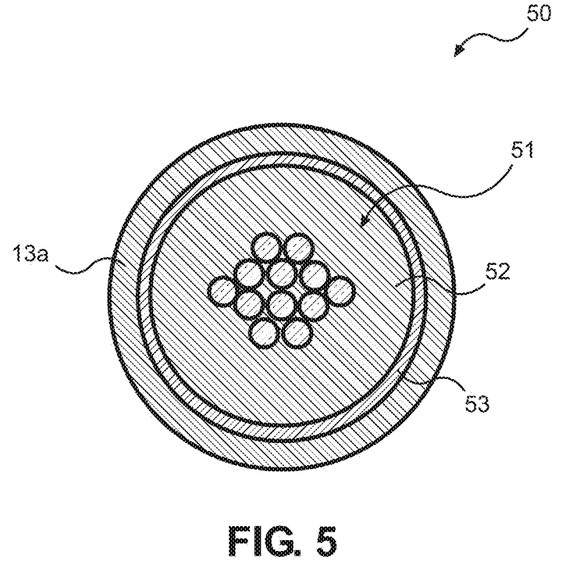
FIG. 5 is a cross-sectional view of an optical cable according to the present disclosure.

FIG. 5 shows an optical electric cable 50 according to another non-limiting embodiment of the disclosure. Cable 50 comprises a plurality of optical cores 51. Each core 51 comprises an optical waveguide surrounded by one or more polymeric coatings and, optionally, a polymeric buffer, all not shown in the figure for sake of clarity. Optical cores 51 are embedded in a water-absorbing gel 52 surrounded by a containment polymeric tube 53. The cable 50 further includes a jacket 13a arranged in a radially outer position with respect to the polymeric tube 53 and surrounding the cable cores 51. According to the disclosure, the jacket 13a can be made of the LS0H polymeric composition according to the present disclosure.

Applicant experienced that the presence of a tannin in the LS0H polymer composition of the present disclosure used for the manufacture of a protecting layer surrounding the cable core(s) allows improving the flame-retardant properties of the cable in combination with the at least one metal hydroxide also in term of lack of dripping from the polymeric material forming such a layer.

In particular, Applicant experienced that tannin, such as tannic acid, promotes the formation of substantially compact and homogeneous cohesive carbon residues ("char") in the protecting layer when it is exposed to a flame, for example in the event of a fire, which results in a substantial reduction or absence of dripping of the polymeric material forming such layer or at least in a significant increase of the fall time of incandescent fragments of the polymeric material, e.g. during the flame test.

Without wishing to be bound to any scientific theory, the char-forming ability of tannin, such as tannic acid, may be due to the formation of a net of cross-linked aromatic structures during combustion.

The above benefits can be achieved while maintaining good mechanical and workability characteristics of the flame-retardant polymer composition.

The presence of a polysiloxane in the LS0H polymer composition according to the present disclosure for use in the manufacture of a protecting layer of a cable can improve dispersion of the inorganic fillers in the polymeric matrix and helps to reduce the viscosity during extrusion thus improving the workability of the flame-retardant polymer composition.

The flame-retardant polymer composition may further comprise conventional components such as antioxidants, processing aids, stabilizers, pigments, coupling agents, etc.

Conventional antioxidants which are suitable for this purpose are by way of example: polymerized trimethyldihydroquinoline, 4,4'-thiobis (3-methyl-6-tert-butyl) phenol, pentaerythritol tetrakis [3-(3,5-di-terz-butyl-4-hydroxyphenyl) propionate], 2,2'-thio-diethylene-bis-[3-(3,5-di-tert-butyl-4-hydroxy-phenyl) propionate] and the like or mixtures thereof.

Processing aids usually added to the base polymer are, for example, calcium stearate, zinc stearate, stearic acid, paraffin wax, silicone rubbers and the like, and mixtures thereof.

The lubricants used are, for example, paraffin waxes of low molecular weight, stearic acid, stearamide, oleamide, erucamide.

Coupling agents may be used with the aim of further improving compatibility between the flame-retardant inorganic fillers and/or aids as indicated above and the polymer base. This coupling agent can be selected from those known in the art, for example: saturated silane compounds or silane compounds containing at least one ethylenic unsaturation, like 3-aminopropyltriethoxysilane. As an alternative, monocarboxylic acids or dicarboxylic acids anhydrides, optionally grafted onto the polymeric base, may be used.

In an embodiment, the coupling agent (compatibilizer) included in the flame-retardant polymer composition of the present disclosure is an anhydride-modified polyethylene homopolymer or copolymer, for example an anhydride-modified ethylene propylene rubber or an anhydride-modified high-density polyethylene (HDPE). Suitable amounts of coupling agent to be used in the composition of the present disclosure may range from 5 to 15 phr.

The electric cable according to the present disclosure may be produced by cable manufacturing techniques known to those skilled in the art. In particular, the protecting layer made of the LS0H polymer composition according to the present disclosure may be formed using conventional extrusion processes with a thickness chosen to comply requirements and needs of the particular application for the cable.

Example 1

Comparative flame-retardant polymer base compositions and compositions according to the disclosure were prepared by mixing, in an open mixer, polymers, flame-retardant filler (metal hydroxide), tannic acid and other additives as indicated in the following Table 1 wherein:
PE-A' is an LLDPE (ethylene-1-octene copolymer) having a density of 0.885 g/cm$^3$;
PE-B' is a VLDPE polymer having a density of 0.911 g/cm$^3$;
PE-C is an HDPE polymer grafted with maleic anhydride and having a density of 0.93 g/cm$^3$;
MDH is a natural magnesium hydroxide (brucite) having a particle size of about 3.3-4.3 micron; and
PDMS is a polydimethylsiloxane.

In Table 1 the amounts of the components are provided as "phr", i.e. parts by weight per 100 parts by weight of the base polymers.

TABLE 1

| Component | Sample A* | Sample B | Sample C | Sample E* |
|---|---|---|---|---|
| PE-A' | 71.3 | 71.3 | 71.3 | 71.3 |
| PE-B' | 19.7 | 19.7 | 19.7 | 19.7 |
| PE-C | 9.0 | 9.0 | 9.0 | 9.0 |
| MDH | 203.6 | 203.6 | 203.6 | 203.6 |
| Tannic acid | — | 20.0 | 20.0 | 5.0 |
| PDMS | 2.4 | 2.4 | — | 2.4 |
| Stearic acid | 6.3 | 6.3 | 6.3 | 6.3 |
| Additives | 1.6 | 1.6 | 1.6 | 1.6 |
| Drop fall mean time (seconds) | 90 | 220 | >240 | 83 |
| Tensile strength (MPa) | 6.5 | 5.3 | 6.2 | 5.9 |
| Elongation @ break (%) | 619 | 345 | 101 | 547 |

The comparative composition and compositions of the disclosure were then extruded from the mixer into respective samples suitable for fire-resistance tests and for evaluation of mechanical properties.

The samples were tested to determine their dripping behaviour under fire conditions and for mechanical properties.

The dripping tests were aimed at detecting the mean time of falling the first piece of the samples (drop fall mean time).

Specimens from plates having dimensions 100×150 mm and 3.0 thick were obtained from each sample and used for carrying out above evaluations.

Each specimen of a sample was clamped vertically from an upper end portion with a clamp fixed on a support while the lower end was free. The specimen was then burned under the action of a flame produced by a bunsen fed with air at a flow rate of 3.8 ml/min and with liquid propane gas (LPG) at a flow rate of 0.65 ml/min, maintaining the ratio between mass flow rates used.

The flame was oriented at about 900 with respect to the specimen and directed towards the lower edge of the specimen at the shorter side thereof.

The flame was held in this position for all the time of the test and the time from approaching the flame at the lower edge of the specimen until the first piece from the specimen falls off (drop fall time) was recorded.

With regard to the mechanical properties, each specimen of a sample was evaluated for tensile strength (TS) and elongation at break (EB) according to IEC 60811-1-1 (1996).

The test was carried out on at least two specimens for each sample and the data provided in Table 1 above are an average of the results.

Table 1 above reports the results of flaming and mechanical properties tests performed on the comparative and test samples.

As for the dripping behaviour, it can be observed that Comparative sample A* had a low drop fall mean time (dripping starts after about 1½ minute under fire). The addition of 5 phr of tannic acid (Sample E) did not provide improvement in the drop fall mean time, on the contrary a slight worsening was observed. The addition of tannic acid to the polymer composition in an amount of 20 phr (Sample B) resulted in a substantial increase of the drop fall mean time which was greater than 3 minutes under fire. In Sample B the observed falling piece was not a flaming droplet, but a char fragment as the sample fully extinguished in 67 seconds. Sample C, comprising 20 phr of tannic acid, but free from polysiloxane showed a greater increase of the drop fall mean time (greater than 4 minutes) but also a decrease in the elongation at break, though still suitable for a material for cable manufacturing.

Therefore, a cable layer made of polymer compositions according to the present disclosure (Samples B and C) improves the cable fire performance, in terms of a better anti-dripping behaviour, to meet the more stringent national and/or international standards.

As for the mechanical properties, such as tensile strength and elongation at break, the tested samples B and C have acceptable mechanical properties for application in electric cables, also for the manufacture of a cable outer sheath or a jacket.

The viscosity of the samples according to the present disclosure, evaluated e.g. according to ISO 289-1 (2015), was found appropriate for extrusion process at industrially profitable speed.

Example 2

Comparative flame-retardant polymer base compositions and compositions according to the disclosure were prepared by mixing, in an open mixer, polymers, flame-retardant filler (metal hydroxide), tannic acid and other additives as indicated in the following Table 2 wherein:
PE-A" is an LLDPE (ethylene-1-octene copolymer) having a density of 0.870 g/cm$^3$;
PE-A''' is an ethylene-propylene-diene copolymer having a density of 0.0.860-0.880 g/cm$^3$; and
MDH is a natural magnesium hydroxide (brucite) having a particle size of about 3.3-4.3 micron;

The comparative composition and compositions of the disclosure were then extruded from the mixer into respective samples suitable for fire-resistance tests and for evaluation of mechanical properties.

In Table 2 the amounts are provided as "phr", i.e. parts by weight per 100 parts by weight of the base polymers.

TABLE 2

| Component | Sample D* | Sample F | Sample G | Sample H | Sample L* |
|---|---|---|---|---|---|
| PE-A" | 77.4 | 77.4 | 77.4 | 77.4 | 77.4 |
| PE-A" | 22.6 | 22.6 | 22.6 | 22.6 | 22.6 |
| MDH | 400.0 | 400.0 | 400.0 | 300.0 | 400.0 |
| Tannic acid | — | 30.0 | 40.0 | 40.0 | 5.0 |
| Antioxidants | 1.1 | 1.1 | 1.1 | 1.1 | 1.1 |
| Lubricants | 27.0 | 27.0 | 27.0 | 12.0 | 12.0 |
| Drop fall mean time (seconds) | 67 | 210 | >240 | >240 | 71 |
| Tensile strength (MPa) | — | 2.3 | 2.7 | 4.7 | — |
| Elongation @ break (%) | — | 1 | 1 | 4.6 | — |

The samples were tested as described above to determine their dripping behaviour under fire conditions and for mechanical properties.

The dripping tests were aimed at detecting the mean time of falling the first piece of the samples (drop fall mean time) and were performed according to the test method disclosed in Example 1.

Table 2 above reports the results of flaming and mechanical properties tests performed on the comparative and test samples.

As for the dripping behaviour, it can be observed that Comparative sample D* had a low drop fall mean time (dripping starts after about 1 minute under fire). Comparative sample L* is added with 5 phr of tannic acid and the drop fall mean time does not improve significantly as compared to the one of Comparative sample D*. The addition of tannic acid to the polymer composition in an amount of 30 phr (Sample F) resulted in a substantial increase of the drop fall mean time which was greater than 3 minutes under fire. The increase of the amount of tannic acid added to the polymer composition to 40 phr (Samples G and H) resulted in a further increase of the drop fall mean time which was greater than 4 minutes under fire or even no dripping was observed over the time of the test.

Sample H had better mechanical properties than Samples F and G as it contains a lower amount of metal hydroxide as flame retardant filler. Nonetheless the behaviour of Sample H under fire is substantially similar and even better or those of Samples G and F. Therefore, a cable layer made of polymer compositions according to the present disclosure (Samples F to H) improves the cable fire performance, in terms of a better anti-dripping behaviour, to meet the more stringent national and/or international standards.

The presence of tannic acid in the polymeric composition in amounts according to the present disclosure also allows to obtain a more compact and uniform char on the burned samples obtained from such composition compared to the sample obtained from the polymeric composition not including tannic acid. This can be appreciated by the long dripping time/absence of dripping of the samples F to H according to the present disclosure. Consequently, the presence of tannic acid imparts good flame performance also in terms of char forming and consequently in drop resistant effect to the polymeric composition of the present disclosure.

As for the mechanical properties, such as tensile strength and elongation at break, all tested samples F to H have acceptable mechanical properties for application in electric cables, particularly for the manufacture of a filler (or bedding) layer.

The tests above shows that presence of tannic acid in the polymeric composition in amounts according to the present disclosure also allows obtaining a more compact and uniform char on the burned samples obtained from such composition compared to the sample obtained from the polymeric composition not including tannic acid. This can be appreciated by the long dripping time/absence of dripping of the samples according to the present disclosure. The presence of tannic acid imparts good flame performance also in terms of char forming and consequently in terms of drop resistant effect to the polymeric composition of the present disclosure.

The invention claimed is:

1. A flame-retardant cable, comprising:
   at least one core comprising a conductor; and
   at least one protecting layer surrounding the core;
   wherein:
   the protecting layer is made from a low smoke zero halogen (LS0H) flame-retardant polymer composition comprising at least 70 phr of a polyethylene homopolymer or copolymer having a density lower than 0.90 g/cm$^3$ as a halogen-free polymeric base, and:
   a) 100 to 800 phr of at least one metal hydroxide; and
   b) 10 to 60 phr of a tannin.

2. A flame-retardant cable according to claim 1, wherein the cable is an electric cable, an optical cable, or a hybrid cable.

3. The flame-retardant cable according to claim 1, wherein the polymeric base comprises the polyethylene homopolymer or copolymer having a density lower than 0.90 g/cm$^3$ as major component.

4. The flame-retardant cable according to claim 1, wherein the metal hydroxide is present in an amount of 150 to 400 phr.

5. The flame-retardant cable according to claim 1, wherein the metal hydroxide is at least one selected from the group consisting of magnesium hydroxide and aluminium hydroxide.

6. The flame-retardant cable according to claim 1, wherein the tannin is tannic acid.

7. The flame-retardant cable according to claim 1, wherein the flame-retardant polymer composition further comprises a polysiloxane.

8. The flame-retardant cable according to claim 7, wherein the polysiloxane is present in an amount from 1.5 to 4 phr.

9. The flame-retardant cable according to claim 1, wherein the flame-retardant polymer composition further comprises a polyethylene homopolymer or copolymer having a density of 0.90-0.92 g/cm$^3$.

10. The flame-retardant cable according to claim 9, wherein the polyethylene homopolymer or copolymer having a density of 0.90-0.92 g/cm$^3$ is present in an amount of up to 25 phr.

11. The flame-retardant cable according to claim 10, wherein the polyethylene homopolymer or copolymer having a density of 0.90-0.92 g/cm$^3$ is present in an amount of 15 to 25 phr.

12. The flame-retardant cable according to claim 1, wherein the flame-retardant polymer composition further comprises a polyethylene homopolymer or copolymer having a density greater than 0.92 g/cm$^3$.

13. The flame-retardant cable according to claim 12, wherein the polyethylene homopolymer or copolymer having a density greater than 0.92 g/cm$^3$ is present in an amount up to 15 phr.

14. The flame-retardant cable according to claim 13, wherein the polyethylene homopolymer or copolymer having a density greater than 0.92 g/cm$^3$ is present in an amount of 5 to 15 phr.

15. The flame-retardant cable according to claim 1, wherein the flame-retardant polymer composition comprises a polyethylene homopolymer or copolymer grafted with a compatibilizer in an amount of 5 to 15 phr.

* * * * *